Figure 1:
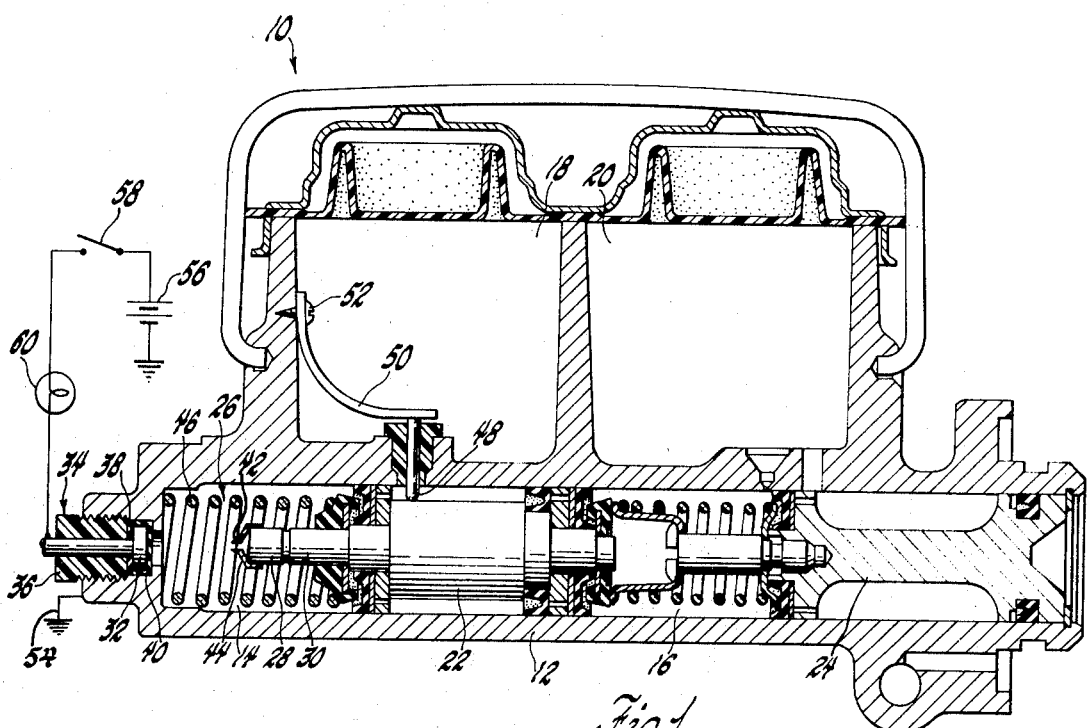

United States Patent

Graham

[15] 3,635,024

[45] Jan. 18, 1972

[54] MASTER CYLINDER ASSEMBLY

[72] Inventor: Robert W. Graham, Birmingham, Mich.

[73] Assignee: General Motors Corporation, Detroit, Mich.

[22] Filed: Jan. 7, 1970

[21] Appl. No.: 1,126

[52] U.S. Cl. .......................................... 60/54.6 E, 340/52 C
[51] Int. Cl. ........................................................ F15b 7/00
[58] Field of Search ............... 60/54.6 E; 200/168 G; 340/69; 339/96

[56] References Cited

UNITED STATES PATENTS 2,877,324  3/1959  Oshry ............................... 200/168 G
3,127,230  3/1964  Marquis et al. ......................... 339/96
3,412,556  11/1968  Rike et al. ............................. 60/54.6 E Primary Examiner—Martin P. Schwadron
Assistant Examiner—A. M. Zupcic
Attorney—Jean L. Carpenter and Paul Fitzpatrick

[57] ABSTRACT

A master cylinder assembly including a switch operative in accordance with the position of a hydraulic fluid pressurizing piston and an indicator device energized in accordance with the switch operation so as to indicate when the piston is positioned outside of predetermined limits. An insulating member is provided for preventing electrolysis of the hydraulic fluid between the switch contacts.

13 Claims, 7 Drawing Figures

PATENTED JAN 18 1972

3,635,024

SHEET 1 OF 2

INVENTOR.
Robert W. Graham
BY
Paul Fitzpatrick
ATTORNEY

INVENTOR.
Robert W. Graham
BY
Paul Fitzpatrick
ATTORNEY

MASTER CYLINDER ASSEMBLY

This invention relates to indicators for advising that a hydraulic fluid pressurizing piston has traveled outside of predetermined limits and, more particularly, to master cylinder assemblies for providing an indication of excessive piston travel therein.

Brake systems for stopping motor vehicles are of many diverse types. The most common motor vehicle brake systems employ hydraulic actuating means comprising individual wheel cylinder assemblies located at each wheel of the motor vehicle and a master cylinder assembly for providing hydraulic fluid under pressure to the individual wheel cylinder assemblies.

As in all hydraulic systems, leakage of hydraulic fluid sometimes takes place in motor vehicle brake systems, which leakage is usually replaced in the system by fluid held in a reservoir provided in the master cylinder. The reservoir is refilled from time to time to maintain an adequate reserve of hydraulic fluid for use by the brake system.

During recent years it has become customary to separate the hydraulic fluid supply for a motor vehicle's front wheel brakes from that for the motor vehicle's rear wheel brakes to prevent leakage from a single hydraulic line deactivating all of a motor vehicle's brakes. Rike et al. U.S. Pat. No. 3,412,556 illustrates a means whereby this isolation between front and rear wheel brake systems may readily be provided by use of a master cylinder assembly having separate hydraulic fluid reservoirs and a plurality of hydraulic fluid pressurizing pistons therein. As is suggested in the Rike patent, switch means may be provided in the master cylinder assembly for providing an indication of excessive pistol travel therein so as to advise the operator of a motor vehicle that a portion of the vehice's brake system is inoperative. Since adequate braking is provided the motor vehicle by either the front or rear brakes acting alone, the indication facilitates the operator learning this information.

While indicators employed for this purpose may include switches of either normally open or normally closed type, the circuitry associated therewith usually dictates that a normally open switch is the preferred type. Unfortunately, normally open switches in indicators such as this usually provide a potential difference across the normally open switch contacts, which have hydraulic fluid therebetween, causing electrolysis of the hydraulic fluid. While the hydraulic fluids in common use at the present time in vehicle brake systems are of many diverse compositions, most of them form corrosive agents, such as acids, when subjected to electrolysis. These corrosive agents increase the natural corrosion rate of the master cylinder assembly. While electrolysis between the switch contact can be kept to a minimum in designing the switch to be of a normally closed type, this solution is unsatisfactory for the reason earlier recited. Another means of minimizing the electrolysis of the hydraulic fluid is to modify the indicator circuitry so as to lower the voltage applied across the normally open switch contacts so as to lessen the effect of he electrolysis, but this solution has not been found practical as it necessitates the use of additional circuitry, increasing the expense of the indicator.

To eliminate the foregoing and other disadvantages, it is an object of this invention to provide an indicator for advising of excessive piston movement in a hydraulic fluid pressurizing chamber by utilizing a normally open switch having at least one contact electrically isolated from the hydraulic fluid so as to prevent electrolysis of the hydraulic fluid.

It is another object of this invention to provide a master cylinder assembly including a normally open switch having at least one of its contacts electrically isolated from the hydraulic fluid therein so as to prevent electrolysis of the hydraulic fluid.

A further object of this invention is to provide a master cylinder assembly which includes a normally open switch having a self-resealing resilient member positioned between the switch contacts so as to prevent electrolysis of the hydraulic fluid between the contacts.

An additional object of this invention is to provide a master cylinder assembly having a self-resealing resilient coating member secured to at least one contact of a switch so as to prevent electrolysis of hydraulic fluid between the switch contacts.

It is a more specific object of this invention to provide a master cylinder assembly that includes a self-sealing resilient coating member having guide means formed therein and secured to at least one of the switch contacts so as to facilitate the electrical connection of the switch contacts.

Figure 2:
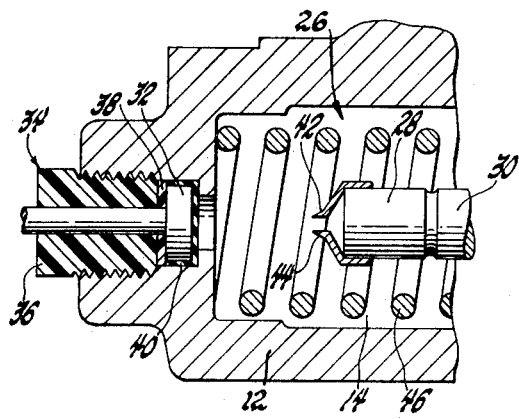
Figure 3:
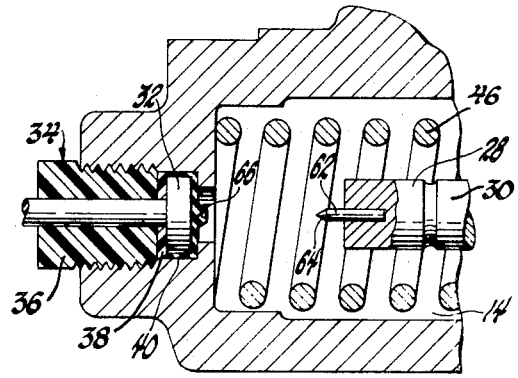
Figure 4:
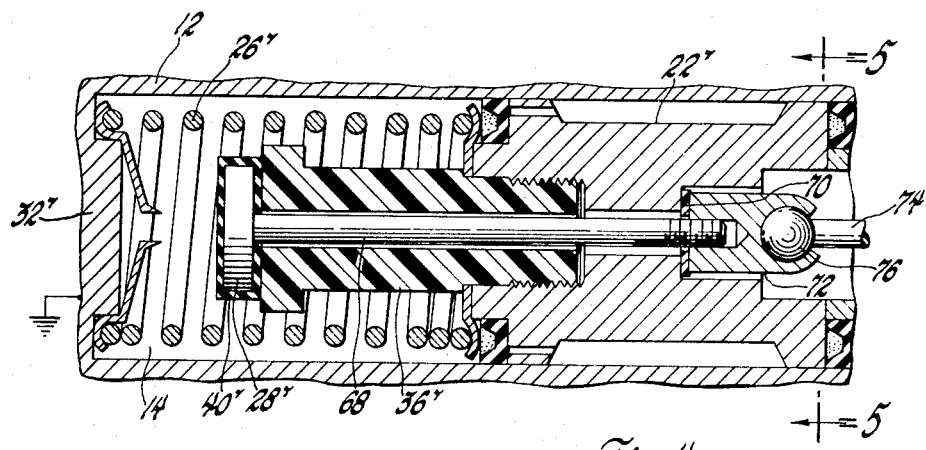
Figure 5:
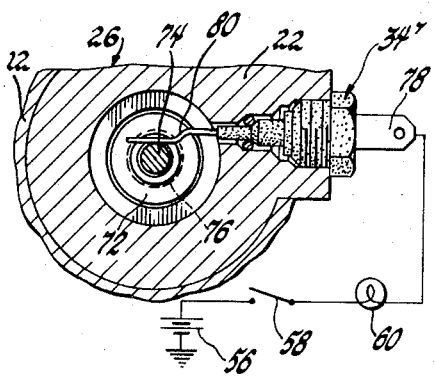
Figure 6:
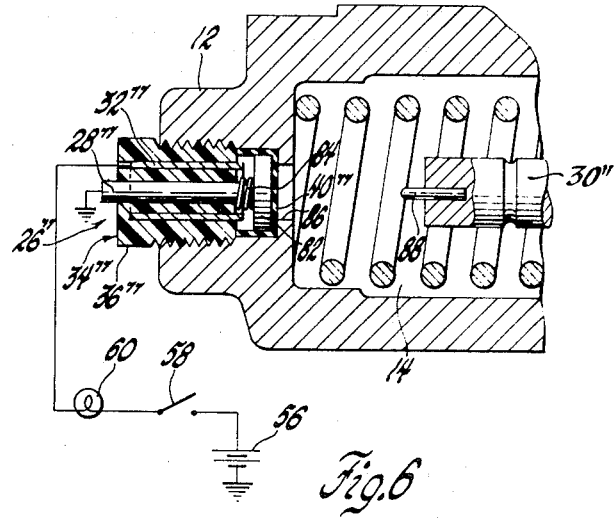
Figure 7:
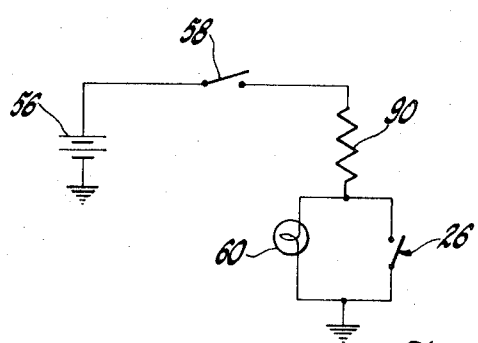

The foregoing and other objects and advantages of the subject invention will become apparent from the following drawings, in which:

FIG. 1 discloses a master cylinder assembly embodying the principles of the subject invention, FIG. 2 presents an enlarged sectional view of a switch incorporated in the master cylinder assembly presented in FIG. 1, FIG. 3 presents a modification of the switch presented in FIG. 2, FIG. 6 portrays an additional modification of the FIGS. 4 and 5 disclose another modification of the switch presented in FIG. 2, switch disclosed in FIG. 2, and FIG. 7 schematically illustrates a modification of the circuitry illustrated in FIG. 1.

Referring now to the drawings, there is presented in FIG. 1 a master cylinder assembly 10 of the well-known type described in the aforementioned patent to Rike et al. The master cylinder assembly 10 includes a cylinder body 12 having formed therein first and second hydraulic fluid pressurizing chambers 14 and 16 and first and second hydraulic fluid reservoirs 18 and 20 for supplying hydraulic fluid to the pressurizing chambers 14 and 16 as needed. Pressurizing means in the form of first and second pistons 22 and 24 are provided for pressurizing hydraulic fluid in the reservoirs 14 and 16 in the well-known fashion explained in detail in Rike et al.

The master cylinder assembly 10 also includes a switch 26 shown in an enlarged view in FIG. 2, having a first contact 28 secured by a connector member 30 to the piston 22 so as to be movable therewith and a second contact 32 secured to the cylinder body 12 by an insulating plug assembly 34 that includes a threaded plug 36 and an insulating washer 38. An insulating member 40 made of a self-resealing substance, such as rubber, is secured in the form of a coating to the second contact 32 so as to electrically insulate the second contact 32 from hydraulic fluid in the chamber 14 and from the cylinder body 12. Engagement means in the form of a pair of projections 42 and 44 are secured to the movable contact 28, as by brazing, for piercing the insulating member 40 so as to facilitate the completion of an electrical connection between the first and second contacts 28 and 32.

While the master cylinder assembly 10 in FIG. 1 is of a type having a plurality of pistons, it will be apparent to persons skilled in the art that the subject invention is applicable to many other types of apparatus having one or more hydraulic fluid pressurizing means. The operation of the subject apparatus will therefore be described with reference solely to the apparatus dealing with the pressurizing of hydraulic fluid in the first chamber 14 and for descriptive purposes the first and second contacts 28 and 32 will be referred to as the movable and fixed contacts 28 and 32, respectively.

During operation of the master cylinder assembly 10 the piston 22 pressurizes hydraulic fluid in the first chamber 14 due to an increase of pressure in the second chamber 16. Due to the pressurization in the first chamber 14 some hydraulic fluid leaves the first chamber 14 to actuate the well-known wheel cylinder assemblies (not shown) and the piston 22 motion causes the movable contact 28 to approach the fixed contact 32. So long as the pressure in the first chamber 14 can be increased sufficiently to equal the pressure in the second chamber 16 the contacts 28 and 32 remain separated. When the pressure in the second chamber 16 is reduced the piston 22 is returned to its initial position by a spring 46, which position is established by a piston stop 48.

The piston stop 48 is held in sliding contact with the piston 22 by a spring 50 secured to the cylinder body 12, as by a screw 52. By grounding the cylinder body 12, as at 54, the piston 22 is grounded through the electrical connection of the piston stop 48, the spring 50, the screw 52, and the cylinder body 12.

As is seen in FIG. 1, a potential other than ground potential is supplied to the fixed contact 32 by a power source, such as a battery 56, in series with a switch 58, an indicator device in the form of a lamp 60, and the fixed contact 32. Persons skilled in the art will appreciate that the lamp 60 will become energized when the switch 58 is closed and an electrical connection is completed between the fixed contact 32 and the grounded movable contact 28.

While the switch 58 in practice may be unnecessary for a given application, since the lamp 60 remains deenergized so long as the contacts 28 and 32 remain separated, it provides an additional means of control for the lamp 60. For example, if the master cylinder assembly is employed in a motor vehicle, the switch 58 may be operative in accordance with either the well-known motor vehicle ignition switch (not shown) or the well-known motor vehicle brake light switch (not shown). The lamp 60 may thus be precluded from energization except when a vehicle ignition is energized or when the vehicle's brakes are being applied. Similarly, by the addition of another switch, persons skilled in the art will appreciate that the lamp 60 energization may also be made dependent upon both of these conditions existing simultaneously.

In the event of hydraulic fluid leakage from the hydraulic system supplied by the chamber 14, the piston 22 travel will be increased so as to lessen the distance between the contacts 28 and 32. So long as this travel is within predetermined limits, that is, bounded by the piston stop 48 and by the point at which an electrical connection is made between the contacts 28 and 32, the lamp 60 remains deenergized. However, when the switch 58 is closed and overtravel of the piston 22 occurs, that is, the piston travel exceeds the predetermined limits, the projections 42 and 44 pierce the insulating member 40 so as to complete an electrical connection between the contacts 28 and 32, causing energization of the lamp 60. The lamp 60 thus advises the vehicle occupants of the excessive piston 22 travel when they may otherwise be unaware of the low pressure in the chamber 14 due to the pressure in the chamber 16 and the hydraulic system it supplies satisfying the vehicle's braking requirements.

As is shown in FIG. 3, the insulating member 40 may be provided with guide means formed therein for facilitating the engagement of the contacts 28 and 32. In FIG. 3 the projections 42 and 44 have been replaced by a single projection 62 having a pointed end 64 and the insulating member 40 is provided with a conical guide 66 for receiving the pointed end 64 of the projection 62. The guide 66 thus serves to maintain alignment of the projection 62 while the insulating member 40 continues to function in the fashion previously described, that is, it electrically insulates the fixed contact 32 from hydraulic fluid in the chamber 14 so as to prevent electrolysis of the hydraulic fluid by the potential difference between the contacts 28 and 32.

In the modification presented in FIGS. 4 and 5 the polarity of the contacts 28' and 32' has been reversed by grounding the fixed contact 32' and placing the movable contact 28' at a potential other than ground potential. While the fixed contact 32' may be grounded in a number of ways, it is readily achieved by forming the fixed contact 32' as an integral part of the cylinder body 12. Since hydraulic fluid in the chamber 14 in the modification illustrated in FIG. 4 is free to contact the grounded cylinder body 12 it must be prevented from touching the movable contact 28' to prevent electrolysis from taking place. This is achieved by coating the movable contact 28' with an insulating member 40' and shielding the elongated stem 68 of the movable contact 28' from the hydraulic fluid by means of an insulating threaded plug 36'. The stem 68 is prevented from touching the piston 22' by supporting it in an insulated washer 70 and an electrically conductive connector member 72 mechanically driven by a push rod 74 which is pivotally mounted therein at 76.

As is seen in FIG. 5, the push rod 74 has a potential other than ground potential applied thereto by the battery 56 through the closed switch 58, the lamp 60, a terminal 78 embedded in an insulating plug assembly 34', and a spring contact 80 that is biased to maintain sliding contact with the push rod 74.

An additional modification of the switch 26 is presented in FIG. 6. In this embodiment the plug assembly 34'' includes an annular fixed contact 32'' embedded in an insulating plug 36''. A movable contact 28'' having an enlarged end portion 82 is electrically grounded and slidably positioned in the insulating plug 36''. The contacts 28'' and 32'' are insulated from the hydraulic fluid in the chamber 14 by the insulating member 40'' and the movable contact 28'' is biased by a spring 84 so as to bear upon the perimeter of an opening 86 in the cylinder body 12. Engagement means in the form of a projection 88 secured to the piston 22 by a connector member 30'' is provided for deflecting the insulating member 40'' so as to press the movable contact 28'' into engagement with the fixed contact 32'' when the piston 22 travel exceeds the predetermined limits, the spring 84 being sufficiently strong to prevent the connector member 82 from connecting the contacts 28'' and 32'' as a result of mere hydraulic fluid pressure in the chamber 14. When the contacts 28'' and 32'' are closed a current path is completed through the lamp 60, causing the battery 56 to energize the lamp 60 as previously described.

While the preceding description has been directed toward the energization of the lamp 60 in the event of the piston 22 travel exceeding the predetermined limits, the circuit disclosed in FIG. 7 illustrates how the lamp 60 may be normally energized by the battery 56 through the switch 58 and a resistor 90 and may be deenergized upon closure of the switch 26, closure of the switch 26 applying ground potential to both sides of the lamp 60 so as to deenergize the lamp 60.

While the subject invention has been described in the illustrated embodiment and various modifications thereof, further modifications and adaptations of the subject invention will be apparent to those versed in the art.

What is claimed is:

1. A master cylinder assembly comprising a cylinder body including a hydraulic fluid pressurizing chamber formed therein, hydraulic fluid pressurizing means including at least one piston positioned in the chamber and movable so as to pressurize hydraulic fluid in the chamber, the piston being movable between predetermined limits and operable for movement outside the predetermined limits, a switch including a movable contact secured to the piston so as to be movable therewith and a second contact positioned so as to be engaged by the movable contact, the second and movable contacts being engageable in accordance with the piston movement so as to be engaged when the piston is positioned outside the predetermined limits and disengaged when the piston is positioned within the predetermined limits, an insulating member positioned between the contacts so as to prevent electrolysis therebetween, and engagement means secured to at least one of the contacts for piercing the insulating member so as to facilitate engaging the contacts when the piston is positioned outside the predetermined limits, thereby providing an electrical connection between the contacts when the piston is positioned outside the predetermined limits.

2. The master cylinder assembly of claim 1 in which the insulating member is comprised of a self-sealing resilient substance.

3. The apparatus of claim 1 in which the insulating member is in the form of a coating on the second contact.

4. The master cylinder assembly of claim 1 in which the insulating member is in the form of a coating on he movable contact.

5. The master cylinder assembly of claim 3 in which the engagement means are secured to the movable contact and the insulating member has guide means formed therein for guiding the engagement means therethrough.

6. The master cylinder assembly of claim 4 in which the engagement means is secured to the second contact and the insulating member has guide means formed therein for guiding the engagement means therethrough.

7. The master cylinder assembly of claim 1 in which the engagement means includes at least one projection secured to at least one contact for piercing the insulating member so as to facilitate engaging the contacts when the piston is positioned outside the predetermined limits.

8. An indicator for advising of piston travel outside of predetermined limits in a hydraulic fluid pressurizing chamber comprising, in combination, an indicator device, a power source for energizing he indicator device, a switch for controlling the energization of the indicator device by the power source in accordance with the piston position, the switch including a movable contact secured to the piston so as to be movable therewith and a second contact positioned so as to be engaged by the movable contact, the second and movable contacts being engageable in accordance with the piston movement so as to be disengaged when the piston is positioned within the predetermined limits and engaged when the piston is positioned outside the predetermined limits, an insulating member positioned between the contacts so as to prevent electrolysis of the hydraulic fluid therebetween, and engagement means secured to at least one of the contacts for facilitating engagement of the contacts when the piston is positioned outside the predetermined limits, thereby providing an electrical connection between the contacts when the piston is positioned outside the predetermined limits.

9. In a master cylinder assembly including a cylinder body having a hydraulic fluid pressurizing chamber formed therein and hydraulic fluid pressurizing means including at least one piston positioned in the chamber and movable so as to pressurize hydraulic fluid in the chamber, the piston being movable between predetermined limits and operable for movement outside the predetermined limits, the combination of a switch including a movable contact secured to the piston so as to be movable therewith and a second contact positioned so as to be engaged by the movable contact, the second and movable contacts being engageable in accordance with the piston movement so as to be engaged when the piston is positioned outside the predetermined limits and disengaged when the piston is positioned within the predetermined limits, an insulating member positioned between the contacts so as to prevent electrolysis therebetween, and engagement means secured to at least one of the contacts for piercing the insulating member so as to facilitate engaging the contacts when the piston is positioned outside the predetermined limits, thereby providing an electrical connection between the contacts when the piston is positioned outside the predetermined limits.

10. The combination of claim 9 in which the engagement means includes at least one projection secured to at least one contact for piercing the insulating member so as to facilitate engaging the contacts when the piston is positioned outside the predetermined limits.

11. Apparatus for detecting piston travel outside of predetermined limits in a hydraulic fluid pressurizing chamber comprising, in combination, a switch including a movable contact secured to the piston so as to be movable therewith and a second contact positioned so as to be engaged by the movable contact, the second and movable contacts being engageable in accordance with the piston movement so as to be engaged when the piston is positioned outside the predetermined limits and disengaged when the piston is positioned within the predetermined limits, an insulating member positioned between the contacts so as to prevent electrolysis therebetween, and engagement means secured to at least one of the contacts for piercing the insulating member so as to facilitate engaging the contacts when the piston is positioned outside the predetermined limits, thereby providing an electrical connection between the contacts when the piston is positioned outside the predetermined limits.

12. The apparatus of claim 11 in which the engagement means includes at least one projection secured to at least one contact for piercing the insulating member so as to facilitate engaging the contacts when the piston is positioned outside the predetermined limits.

13. A master cylinder assembly comprising a cylinder body including a hydraulic fluid pressurizing chamber formed therein, hydraulic fluid pressurizing means including at least one piston positioned in the chamber and movable so as to pressurize hydraulic fluid in the chamber, the piston being movable between predetermined limits and operable for movement outside the predetermined limits, a switch including a movable contact movable in accordance with the piston movement so as to be movable therewith and a second contact positioned so as to be engaged by the movable contact, the second and movable contacts being engageable in accordance with the piston movement so as to be engaged when the piston is positioned outside the predetermined limits and disengaged when the piston is positioned within the predetermined limits, an insulating member positioned between at least one of the contacts and the hydraulic fluid so as to prevent electrolysis of the hydraulic fluid, and engagement means secured to the piston so as to facilitate engaging the contacts when the piston is positioned outside the predetermined limits, thereby providing an electrical connection between the contacts when the piston is positioned outside the predetermined limits.

* * * * *

PO-1050
(5/69)

UNITED STATES PATENT OFFICE
CERTIFICATE OF CORRECTION

Patent No. 3,635,024            Dated January 18, 1972

Inventor(s) Robert W. Graham

It is certified that error appears in the above-identified patent and that said Letters Patent are hereby corrected as shown below:

Col. 1, line 57, "he" should be -- the --.
Col. 2,
lines 20 through 22, "FIG. 6 portrays an additional modification of the FIGS. 4 and 5 disclose another modification of the switch presented in FIG. 2, switch disclosed in FIG. 2, and" should read -- FIGS. 4 and 5 disclose another modification of the switch presented in FIG. 2,
     FIG. 6 portrays an additional modification of the switch disclosed in FIG. 2, and --.

Signed and sealed this 5th day of December 1972.

(SEAL)
Attest:

EDWARD M. FLETCHER, JR.            ROBERT GOTTSCHALK
Attesting Officer                    Commissioner of Patents